March 16, 1943.  V. O. BEAM  2,314,266

THROTTLING REGULATOR

Filed July 14, 1939  3 Sheets-Sheet 1

INVENTOR.
VILYNN O. BEAM
ATTORNEYS

March 16, 1943. V. O. BEAM 2,314,266
THROTTLING REGULATOR
Filed July 14, 1939 3 Sheets-Sheet 2

INVENTOR.
VILYNN O. BEAM
BY Kwis Hudson & Kent
ATTORNEY.

March 16, 1943.  V. O. BEAM  2,314,266
THROTTLING REGULATOR
Filed July 14, 1939  3 Sheets-Sheet 3

INVENTOR.
VILYNN O. BEAM
BY
Kwis Hudson Kent
ATTORNEYS

Patented Mar. 16, 1943

2,314,266

UNITED STATES PATENT OFFICE 2,314,266

THROTTLING REGULATOR

Vilynn O. Beam, Cleveland Heights, Ohio, assignor to The Bryant Heater Company, Cleveland, Ohio, a corporation of Ohio Application July 14, 1939, Serial No. 284,503

14 Claims. (Cl. 236—80)

This invention relates to improvements in throttling regulators, and has to do primarily with valves for gas-fired heaters and other apparatus burning natural or artificial gas as a fuel, and more particularly with a valve so constituted as to maintain a substantially constant pressure of gas flowing to the burner regardless of pressure variations in the fuel line, and to decrease the pressure of gas delivered to the burner, that is, to throttle the same, in the event that through some fault or incorrect adjustment of the other controls of the system the heating equipment is functioning at too rapid a rate.

One of the objects of the invention is the provision of means for controlling the rate of opening of the main valve upon a call for heat so as to produce any desired flare or more gradual flow of gas at the time of ignition.

Another object is the provision of means for this purpose embodying a bleed hole in an air chamber, which hole will not clog up even though adjusted to an opening of minute size.

Still another object of the invention is the provision of means for accomplishing the above objects in conjunction with a snap valve and a combined regulator and throttle valve.

Other objects and features of novelty will appear as I proceed with the description of that embodiment of the invention which, for the purposes of the present application, I have illustrated in the accompanying drawings in which Fig. 1 is a central vertical sectional view, more or less diagrammatic in character, of valve mechanism embodying the invention, this view illustrating the positions of the parts when the high limit control has been operated to shut off the valve under abnormal conditions.

Figure 1:
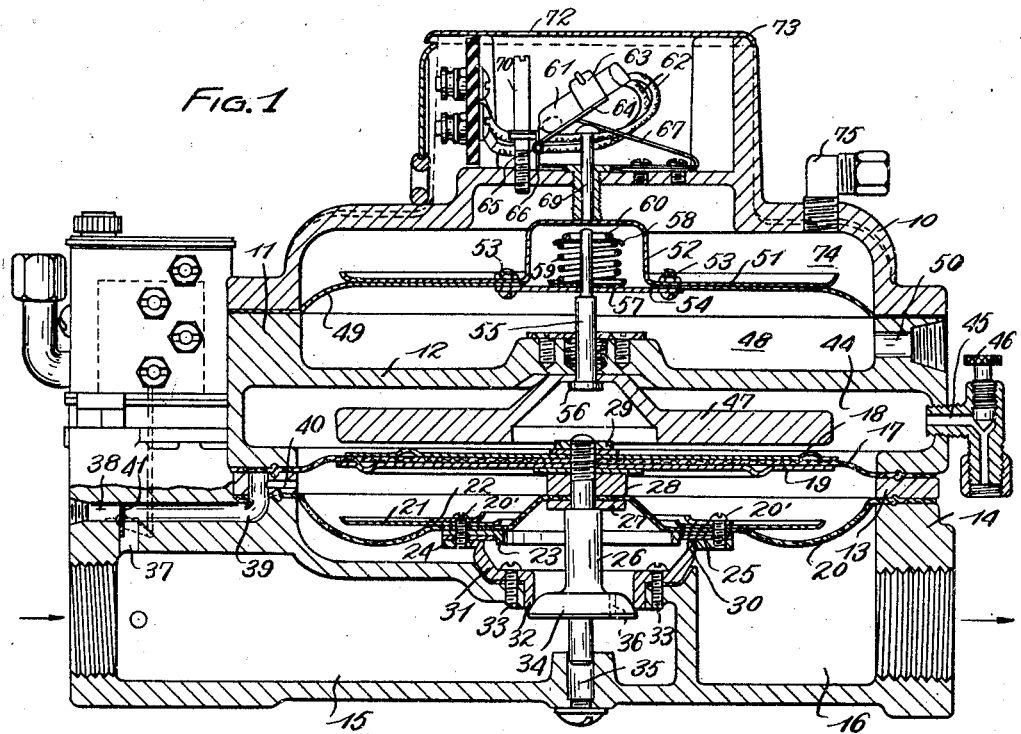
Figure 2:
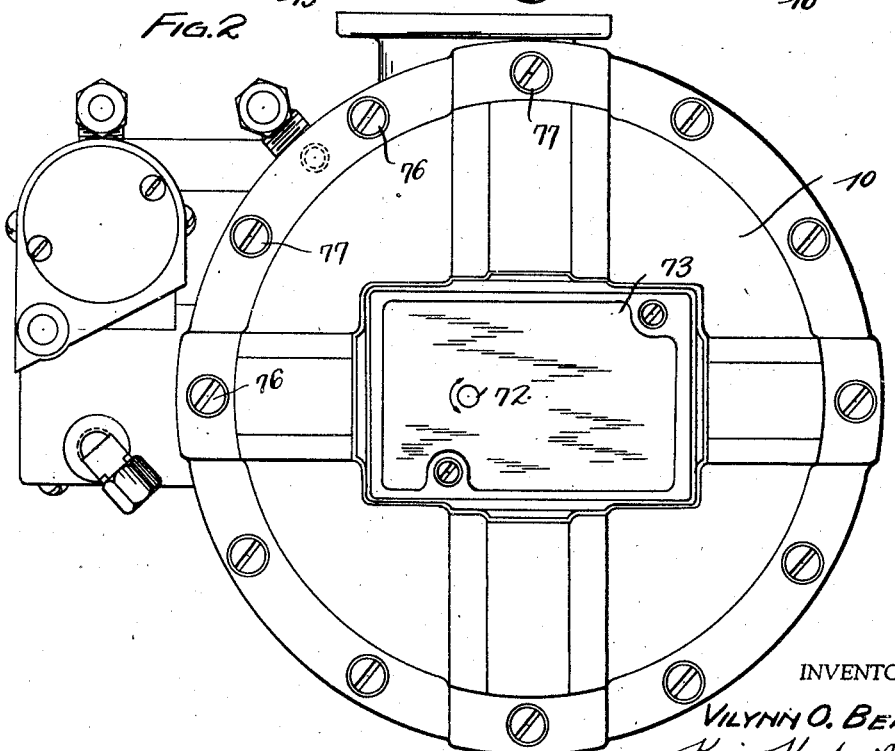
Fig. 2 is a top plan view of a similar valve mechanism.

Referring particularly to Fig. 1 of the drawings, I have illustrated therein a casing formed in several superposed parts, that is to say a top member 10, an intermediate member 11 embodying a horizontal partition 12, a thin ring member 13 and a bottom member 14. The bottom member includes a gas conductor 15 for the incoming fuel and a gas conductor 16 which is adapted to be connected by suitable means to the burner, not shown. As will be apparent from the other views of the drawings, the exit conductor is preferably arranged in practice at 90° to the intake conductor rather than in alignment therewith, as in Fig. 1, but the latter arrangement is adopted in that figure in order to more clearly illustrate the invention.

Between the ring 13 and the casing member 11 I mount a diaphragm 17 preferably of leather, the greater portion of which is gripped between upper and lower circular metal plates 18 and 19. The periphery of a second diaphragm 20 is mounted between the ring 13 and the bottom casing member 14. This diaphragm is also preferably of leather. On its upper surface it carries an annular plate 21 and a relatively narrow annular element 22, while on its under surface it carries an annular metal element 23 and a clamping ring 24 between which is carried a yieldable valve piece 25 of annular form, these various parts being fastened together by means of screws 20' or the like. These two diaphragms are connected centrally by the reduced upper end of a stem 26, there being a washer 27 separating the central portion of diaphragm 20 from the shoulder on stem 26 and a spacing washer 28 which separates the middle portions of the two diaphragms. The stem 26 extends through central perforations in the two diaphragms and at its upper end carries a nut 29 which may be threaded down to clamp the upper diaphragm to the stem, as will be apparent from the drawings.

The annular valve piece 25 is adapted to engage an upwardly extending seat 30 formed at the upper enlarged end of a small hollow casting 31. The lower end of the same casting is turned down through a vertical opening in the casing to present a downwardly extending seat 32. The casting 31 may be secured in place by means of screws 33. The seat 32 is adapted to be engaged by a mushroom valve piece 34 carried by the stem 26. The engagement of valve piece 34 and valve seat 32 also constitutes means for stopping the upward travel of stem 26 and the upward movement of diaphragm 17. The stem is guided in a socket 35 formed in a boss on the casing member 14. The valve piece 34 has a small passageway 36 drilled therethrough for a purpose which will presently appear.

The upper valve, embodying the valve piece 25 and the valve seat 30, is a snap valve functioning in a manner well known in the art, while the lower valve embodying the seat 32 and the valve piece 34 is, firstly, a regulating valve of the character disclosed in Fox Patent 2,111,560 and, secondly, a combined regulating and throttling valve as disclosed in my copending application Serial No. 202,893 filed April 19, 1938.

Suitable means are provided for introducing gas under line pressure into the space between diaphragms 17 and 20 and for discharging it therefrom. As herein disclosed, this means comprises a solenoid valve under control normally of a room thermostat. Fig. 1 shows the necessary conductors and passageways diagrammatically, 37 being a passage leading from the gas intake conductor 15 to the solenoid valve, 38 being the discharge connection which for obvious reasons leads to a pilot or other discharge orifice near the main burner, and the passages 39 and 40 leading from the solenoid valve to the space between the diaphragms. A two-way valve is indicated at 41. When in its dotted line position, the space between the diaphragms is connected to atmosphere, but when it is in its full line position the atmosphere connection is cut off and the space between the diaphragms is connected with the gas line. The valve 41, it should be understood, is a diagrammatic illustration of a solenoid valve.

Figure 4:
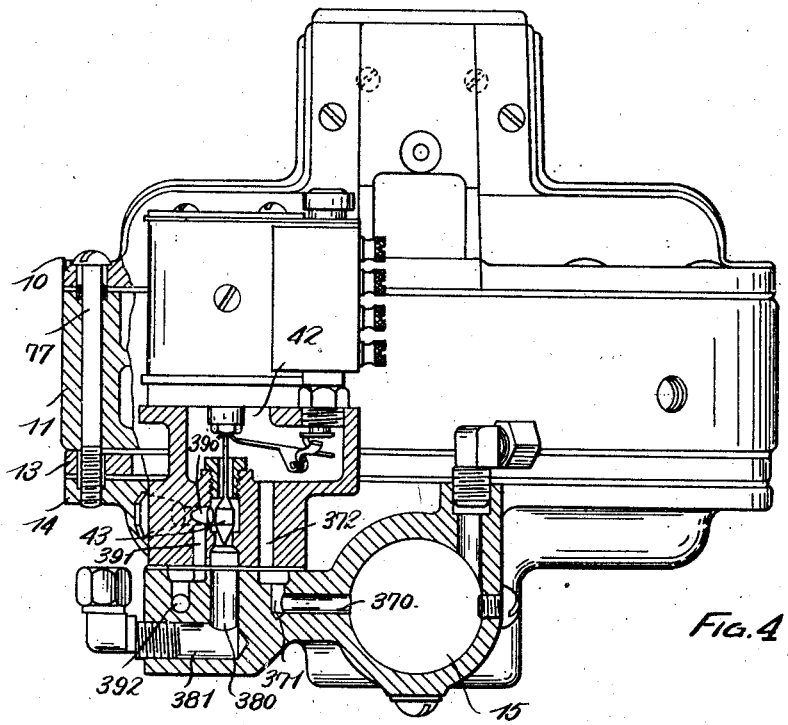
Fig. 4 is a view in elevation looking in the direction of arrow A, Fig. 3, and partly in section on a plane substantially at right angles to the plane of the section in Fig. 3.

In Fig. 4 some of these passages are shown as they are actually constituted in the manufactured apparatus. Here the connection between the gas intake conductor 15 and a chamber 42 beneath the solenoid is shown at 370, 371 and 372, and the discharge to atmosphere (that is to the flue) is indicated at 380, 381 and a part of the connection to the space between the diaphragms is indicated at 390, 391 and 392. In this figure the valve piece of the solenoid valve is shown at 43. When the solenoid is deenergized and the valve piece is down, as illustrated in Fig. 4, gas can flow from the conductor 15 through the passages 370, 371 and 372 to chamber 42 and then through passages 390, 391, 392 and other cored or drilled passages, not shown, to the space between the diaphragms. When the solenoid is energized and the valve piece 43 is raised flow from the conductor 15 is cut off and the space between the diaphragms is connected to atmosphere by way of passages 380 and 381.

In the intermediate casing 11 below the partition 12 there is an air chamber 44 which is closed except for a bleed opening 45 controlled by a needle valve 46 which may be adjusted from a wide open position down to one in which the opening is of minute size only. A regulator weight 47 located within the chamber 44 normally rests upon diaphragm 17, and through the connection of the latter with the valve piece 34 tends to maintain a constant gas pressure in the conductor 16, as fully explained in the Fox patent referred to above.

Figure 3:
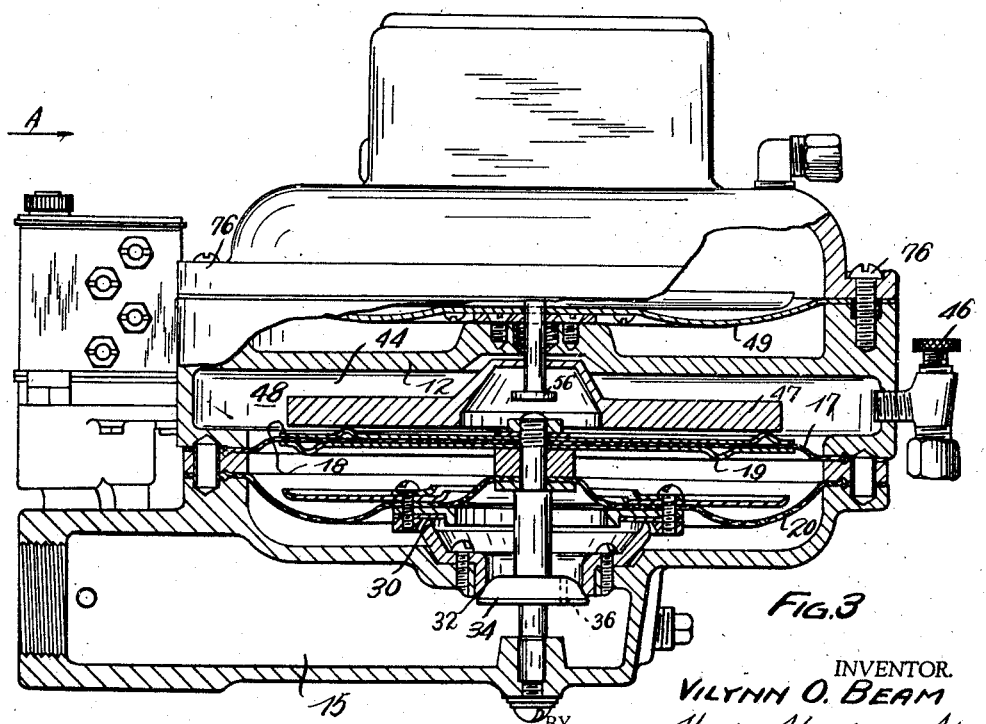
Fig. 3 is a view partly in vertical section of the mechanism of Fig. 2, showing the valve in its normal closed position.
Figure 5:
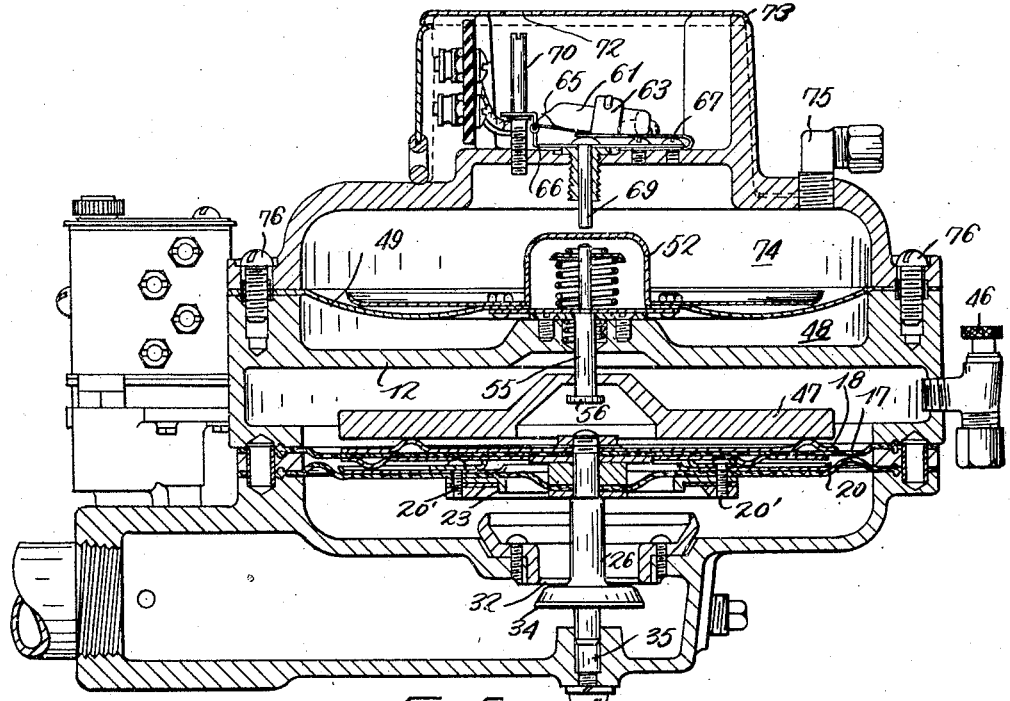
Fig. 5 is a further view similar to that of Fig. 3, but showing the valve in open or running position.

Above the partition 12 there is a pressure chamber 48 which is closed at the top by a third diaphragm 49 that is mounted at its periphery between the adjacent surfaces of the two casing members 10 and 11. This diaphragm is preferably made of rubberized fabric in order to better resist the action of moisture. Chamber 48 is adapted to be connected through a port 50 in one side thereof with some fluid container, the pressure within which is dependent upon conditions in the heating system. In a steam system for example the chamber 48 would be connected with the boiler. The diaphragm 49 is provided with a metal reinforcement 51 having a central cap or dome 52, this reinforcing member being arranged above the diaphragm proper and being connected by bolts or the like 53 with a plate 54 underneath the diaphragm. The central portion of the diaphragm structure is therefore quite rigid, and the weight 47 is arranged to be supported therefrom partially or wholly under certain circumstances. The connection is made by means of a pin hanger 55 which projects downwardly through a suitably packed hole in the partition 12 and loosely through an opening in the weight, being provided on its lower end with a head 56 adapted to engage the underside of the weight. The pin 55 has a reduced upper portion which projects through a hole in plate 54, through washers 57 and 58 spaced apart by a coil spring 59, and carries at its upper extremity a cotter pin or the like 60 by means of which it is supported. Normally the plate 54 rests against the shoulder on the pin, it being only under abnormal pressure conditions in chamber 48 that the spring 59 is compressed, as shown in Fig. 1. When the pressure in chamber 48 is relieved more or less the pin 55 descends to a greater or lesser extent and lowers weight 47 accordingly except for the lift which may be imparted to it by the diaphragm 17. In Figs. 3 and 5 the weight is shown carried exclusively by the diaphragm, but under conditions of lower pressures in chamber 48 the weight may be carried partly by the diaphragm 17 and partly by the diaphragm 49 through the pin 55.

At the top of the device, that is on the casing member 10, I mount a high limit cut-out switch of a novel form. The electrical portion of this switch consists of a mercury tube 61 to one end of which are connected two electrical leads 62. It is to be understood that these leads extend to the solenoid valve, and that when their circuit is opened the solenoid is deenergized and the valve piece 43 permitted to descend, whereupon gas is admitted to the space between the diaphragms to effect a closing of the main valve and likewise of the auxiliary or regulator valve. Preferably this switch is arranged in series with a room thermostat switch.

The mercury tube 61 is mounted between spring clips 63 upon a sheet metal holder 64 which has a hinge connection 65 with an angular supporting strip 66. One end of a rebent leaf spring 67 overlies the strip 66 and both these elements are anchored to the casing member 10 by means of two screws 68. The free portion of the spring 67 normally lies in the position illustrated in Fig. 5 and covers the head of a slidable post 69, the lower extremity of which clears the cap 52 on diaphragm 49 in the normal position of that diaphragm. When diaphragm 49 is raised the free end of spring 67 is pushed upwardly and lifts the free end of holder 64 more or less. The extent to which a certain movement of the spring 67 is communicated to the holder 64 is determined by the height of the hinge 65, and that height is regulated by an adjusting screw 70 upon which there is a collar 71 that underlies the free extremity of strip 66. Raising the hinge 65 in this manner necessitates a further upward movement of post 69 and spring 67 before the mercury globule in tube 61 is caused to run to the left end and thereby to break the circuit through the wires 62. Lowering the hinge 65 of course has the effect of causing the circuit to be broken in response to a lesser upward movement of the post 69. I preferably provide a small opening 72 in the sheet metal cover 73 in order that a screwdriver may be inserted for manipulation of the adjusting screw.

Above the diaphragm 49 there is a chamber 74 which is open to atmosphere at all times. The nipple 75 merely affords a connection for tubing leading to the flue so that in the event any gas should leak into this chamber it would not be discharged into the compartment in which the heater is located. Similarly the fitting in which the needle valve 46 is mounted is intended to be connected with the flue. The various members of the casing may be fastened together by suitable screws 76 and 77.

Figure 8:
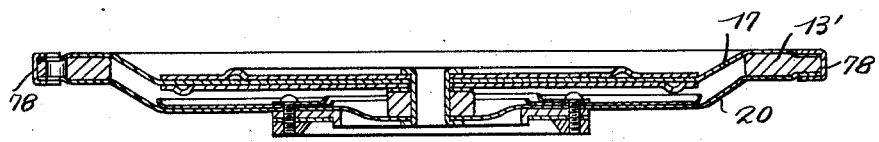
Fig. 8 is a central sectional view of a modified form of double diaphragm construction.
Figure 6:
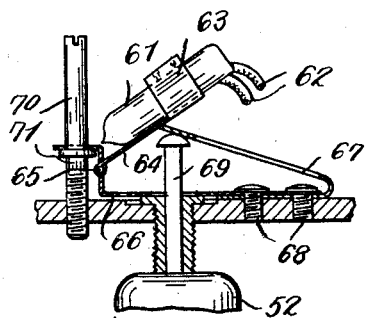
Figs. 6 and 7 are detail views partly elevational and partly sectional on a larger scale showing the high limit control switch employed in connection with the invention.
Figure 7:
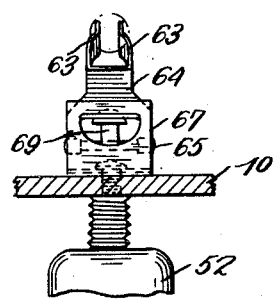

In Fig. 8 I have shown a modified construction embodying a unit assembly of the two diaphragms 17 and 20 mounted upon a ring 13' of reduced thickness at its periphery in order to accommodate a channel-shaped clamping ring 78 by means of which the outer edges of the diaphragms are firmly bound to the ring 13' and an air-tight joint effected. In the event that replacement becomes necessary this unit considerably simplifies the work of the service man. The diaphragms themselves remain the same in structure and in function.

*Operation.*—The normal idle condition of the apparatus is illustrated in Fig. 3. In this case the solenoid valve is down, as shown in Fig. 4, and the space between the diaphragms 17 and 20 is in communication with the incoming gas conductor 15. Gas under line pressure therefore fills the space between the diaphragms and maintains them separated as shown. The lower one 20 has moved down until stopped by the main valve seat 30, while the upper one has moved up until stopped by the engagement of the valve piece 34 with the regulator valve seat 32. The weight 47 is resting upon and carried by a metal part of the diaphragm 17. The small passage 36 in the valve piece 34 serves to connect the space above the valve piece and below the snap valve with the conductor 15, so as to equalize the pressure on opposite sides of the valve piece 34. It is too small a passage to be a factor in the operation of the burner. However, if this connection were omitted the pressure above the valve piece when the valve was closed would be considerably less than that below the valve piece, with the result that the valve piece would be locked in closed position.

Now, when the room thermostat calls for heat the solenoid valve is raised and the gas between the diaphragms 17 and 20 is discharged. The snap valve immediately rises from its seat 30 due to line pressure beneath it. The diaphragm 17 however cannot move down rapidly because that would rapidly increase the volume of chamber 44 and greatly reduce the pressure therein below atmospheric pressure. Hence the diaphragm 17 can descend only so fast as the bleed opening 45 controlled by a needle valve 46 will permit air to enter the chamber. On this account the valve piece 34 is caused to leave its seat slowly and the flow of gas to the burner is accordingly permitted to occur slowly at first and the rate of flow to increase gradually. By manipulation of the needle valve 46 this control may be varied through rather wide limits, it being possible to open the needle valve completely so that instead of a slow opening of valve 34 its opening may take place so rapidly that a surge of gas may occur at the start. Any condition between these limits may of course be attained.

It should be observed also that at different times the pressure of gas in the intake connection 15 may vary more or less. In some cases this pressure may be insufficient to lift the weight 47 far enough to cause the valve piece 34 to tightly engage its seat 32. When, at such times, there is a call for heat, the regulator valve will open to a greater degree for a given time interval than when the regulator valve is tightly seated at the inception of the call for heat. Hence the apparatus compensates automatically for different line pressures at the beginning of an on cycle.

When the discharge of gas from the space between the diaphragms has been completed so that atmospheric pressure obtains there, the parts will occupy the positions substantially as illustrated in Fig. 5, the regulator valve piece 34 floating between its seat and the boss around guide 35. A decrease in line pressure will tend to lower the valve piece 34 and let more gas through the valve, and an increase in line pressuer will tend to raise the valve piece 34 and let less gas through the valve. The outlet pressure is thereby maintained constant.

Now, if conditions in the heater become such that pressure in chamber 48 causes diaphragm 49 to be raised to a predetermined extent then a portion of the load imposed by the weight 47 will be withdrawn from diaphragm 17 and the two diaphragms 17 and 20 will rise in response thereto, reducing the size of the opening of the regulator valve and throttling the flow of gas to the burner accordingly. A continuing rise in pressure in chamber 48 gradually increases this effect and throttles the flow more and more until very little flow is possible. In the meantime the post 69 has been raised somewhat and tilting of the tube 61 on its hinge has begun. At a predetermined pressure point, controlled by the adjustment of screw 70 and the consequent height of hinge 65, the globule of mercury will leave the contacts in the tube, causing the de-energization of the solenoid and the dropping of the solenoid valve, whereupon gas under line pressure will flow into the space between the diaphragms 17 and 20 and immediately close both the snap valve and the regulator valve. This is an abnormal condition illustrated in Fig. 1, and will occur only when the pressure or temperature conditions in the heating plant reach a height above that considered safe or desirable.

The control of the rate of flow of gas to the burner when the valves are opened is an important feature of my invention. Control of this sort has been attempted heretofore by provision for adjusting the vent for a gas chamber above a diaphragm, but such a vent when made small enough to effect slow movement of the valve has been open to the objection of clogging rather easily owing to the presence of vapors and impurities in the gas. In the present invention the small bleed opening for the chamber 44 passes air only and is therefore not subject to clogging no matter to what small size the aperture may be adjusted.

Having thus described my invention I claim:

1. In a gas valve, a valve seat, a pair of spaced diaphragms, a valve piece carried on the external side of one of said diaphragms adapted to contact said seat for closing the valve, a chamber on the opposite side of said pair of diaphragms closed except for a small bleed opening, and means for admitting and exhausting gas to and from the space between said diaphragms, whereby the relieving of gas pressure from the space between the diaphragms enables line pressure to force said valve piece from its seat, the bleeding of air into said chamber permitting slow movement only of the adjacent diaphragm in response to the exhausting of gas from between the diaphragms, and means connected with said last-named diaphragm for interfering to a greater or lesser extent with the flow of gas to said valve, said interference being at a maximum for the maximum pressure of gas between said diaphragms.

2. In a heating plant, a gas conductor, a regulator valve having a seat in direct communication with said conductor, a main valve having a seat in communication with said conductor through said regulator valve seat only, a pair of diaphragms parallel with said main valve seat, the first diaphragm being adjacent said main seat and carrying a valve piece adapted to cooperate with that seat to close the main valve, a regulator valve piece operatively connected with the second of said diaphragms for making contact with said regulator valve seat to close the regulator valve, and means for introducing line pressure from said conductor into the space between said diaphragms for closing both valves.

3. In a heating plant, a gas conductor, a regulator valve having a seat in direct communication with said conductor, a main valve having a seat in communication with said conductor through said regulator valve seat only, a pair of diaphragms parallel with said main valve seat, the first diaphragm being adjacent said main seat and carrying a valve piece adapted to cooperate with that seat to close the main valve, a regulator valve piece operatively connected with the second of said diaphragms for making contact with said regulator valve seat to close the regulator valve, means for introducing line pressure from said conductor into the space between said diaphragms for closing both valves, and an air chamber of which said second diaphragm forms one wall, said chamber being closed except for a small bleed opening, whereby when the gas pressure in the space between said diaphragms is decreased to atmospheric pressure the bleeding of air into said air chamber will permit slow movement only of said second diaphragm and consequent slow opening of the regulator valve.

4. In a gas valve, a main valve seat, a pair of diaphragms spaced apart vertically, a valve piece carried on the underside of the lower diaphragm adapted to contact said seat for closing the valve, a chamber above said diaphragms closed except for a small bleed opening, and means for admitting and exhausting gas to and from the space between said diaphragms, whereby when the pressure between the diaphragms is relieved line pressure forces said valve piece off its seat, an auxiliary valve having a connection through said lower diaphragm to said upper diaphragm adapted to substantially stop the flow of gas to said main valve when line pressure prevails between said diaphragms, the bleeding of air through said bleed opening permitting slow movement only of the upper diaphragm in response to the flow of gas from between the diaphragms, whereby said auxiliary valve opens gradually and a rapid surge of gas to the burner is prevented.

5. In a gas valve, a main valve seat, a pair of diaphragms therefor spaced apart vertically, a valve piece carried on the underside of the lower diaphragm adapted to contact said seat for closing the valve, a chamber above said diaphragms closed except for a small bleed opening, means for admitting and exhausting gas to and from the space between said diaphragms, whereby when the pressure between the diaphragms is relieved line pressure forces said valve piece off its seat, an auxiliary valve having a connection through said lower diaphragm to said upper diaphragm adapted to interrupt the flow of gas to said main valve when line pressure prevails between said diaphragms, the bleeding of air through said bleed opening permitting slow movement only of the upper diaphragm in response to the flow of gas from between the diaphragms, whereby said auxiliary valve opens gradually and a rapid surge of gas to the burner is prevented, and means for regulating the size of said bleed opening.

6. In a heating plant, a gas conductor, an upwardly extending main valve seat, a concentric downwardly extending auxiliary valve seat below said main valve seat, said auxiliary seat being in direct communication with said conductor and said main seat being in communication with the conductor through said auxiliary seat only, a pair of diaphragms above said main valve seat, an annular valve piece carried by said lower diaphragm adapted to engage said main valve seat, a stem depending from said upper diaphragm extending downwardly through said lower diaphragm, an auxiliary valve piece mounted on said stem in a position to engage said auxiliary valve seat from below, and means for introducing gas from said gas conductor into the space between said diaphragms for closing both valves.

7. In a heating plant, a gas conductor, an upwardly extending main valve seat, a concentric downwardly extending auxiliary valve seat below said main valve seat, said auxiliary seat being in direct communication with said conductor and said main seat being in communication with the conductor through said auxiliary seat only, a pair of diaphragms above said main valve seat, an annular valve piece carried by said lower diaphragm adapted to engage said main valve seat, a stem depending from said upper diaphragm extending downwardly through said lower diaphragm, an auxiliary valve piece mounted on said stem in a position to engage said auxiliary valve seat from below, means for introducing gas from said conductor into the space between said diaphragms for closing both valves, said lower diaphragm being adapted to engage said upper diaphragm when the gas pressure between the diaphragms is exhausted and the main valve piece is lifted off its seat by line pressure, and biasing means normally restraining the upward movement of said upper diaphragm in order to give pressure regulating functions to the auxiliary valve.

8. In a heating plant, a gas conductor, an upwardly extending main valve seat, a concentric downwardly extending auxiliary valve seat below said main valve seat, said auxiliary seat being in direct communication with said conductor and said main seat being in communication with the conductor through said auxiliary seat only, a pair of diaphragms above said main valve seat, an annular valve piece carried by said lower diaphragm adapted to engage said main valve seat, a stem depending from said upper diaphragm extending downwardly through said lower diaphragm, an auxiliary valve piece mounted on said stem in a position to engage said auxiliary valve seat from below, means for introducing gas from said gas conductor into the space between said diaphragms for closing both valves, said diaphragm being adapted to engage said upper diaphragm when the gas pressure between the diaphragms is exhausted and the main valve piece is lifted off its seat by line pressure, biasing means normally restraining the upward movement of said upper diaphragm in order to give pressure regulating functions to the auxiliary valve, and pressure means responsive to conditions in the heating plant for decreasing the effect of said biasing means to a greater or lesser extent in order to give throttling functions to said auxiliary valve.

9. In a gas-fired heating plant, means for supplying gas under pressure, a downwardly opening regulator valve in communication with said supply means, an upwardly opening snap valve in communication with said supply means through said regulator valve only, a pair of spaced diaphragms above said valves, the lower diaphragm carrying the valve piece of said snap valve, the upper diaphragm carrying a depending stem extending through the lower diaphragm carrying the valve piece of said regulator valve, means for introducing gas under line pressure to the space between said diaphragms whereby the valve piece for said snap valve is forced downwardly to its seat and the valve piece of said regulating valve is forced upwardly to its seat, and an air chamber located above said diaphragms closed except for a small bleed opening, whereby when the gas pressure in the space between said diaphragms is decreased to atmospheric pressure the bleeding of air into said air chamber will permit a slow descent only of the upper diaphragm and a consequent slow opening of the regulator valve.

10. In a gas-fired heating plant, means for supplying gas under pressure, a downwardly opening regulator valve in communication with said supply means, an upwardly opening snap valve in communication with said supply means through said regulator valve only, a pair of spaced diaphragms above said valves, the lower diaphragm carrying the valve piece of said snap valve, the upper diaphragm carrying a depending stem extending through the lower diaphragm carrying the valve piece of said regulator valve, means for introducing gas under line pressure to the space between said diaphragms whereby the valve piece for said snap valve is forced downwardly to its seat and the valve piece of said regulating valve is forced upwardly to its seat, an air chamber located above said diaphragms closed except for a small bleed opening, whereby when the gas pressure in the space between said diaphragms is reduced to atmospheric pressure the bleeding of air into said air chamber will permit a slow descent only of the upper diaphragm and a consequent slow opening of the regulator valve, said diaphragms being arranged to contact each other when the pressure between them is reduced to atmospheric pressure, and means for exerting a downward biasing effect upon the upper diaphragm.

11. In a gas-fired heating plant, means for supplying gas under pressure, a downwardly opening regulator valve in communication with said supply means, an upwardly opening snap valve in communication with said supply means through said regulator valve only, a pair of spaced diaphragms above said valves, the lower diaphragm carrying the valve piece of said snap valve, the upper diaphragm carrying a depending stem extending through the lower diaphragm carrying the valve piece of said regulator valve, means for introducing gas under line pressure to the space between said diaphragms whereby the valve piece for said snap valve is forced downwardly to its seat and the valve piece of said regulator valve is forced upwardly to its seat, an air chamber located above said diaphragms closed except for a small bleed opening, whereby when the gas pressure in the space between said diaphragms is reduced to atmospheric pressure the bleeding of air into said air chamber will permit a slow descent only of the upper diaphragm and a consequent slow opening of the regulator valve, said diaphragms being arranged to contact each other when the pressure between them is reduced to atmospheric pressure, means for exerting a downward biasing effect upon the upper diaphragm, and pressure means responsive to conditions in the heating plant for reducing the effect of said biasing means and enabling the regulator valve to throttle the flow of gas.

12. In a fluid fuel heating plant, a fuel valve, a pressure chamber the pressure in which is responsive to varying conditions in the heating plant, a diaphragm forming one wall of said chamber, an electric switch, means controlled thereby for closing said valve, said switch comprising a mercury tube and a hinged holder therefor, a leaf spring parallel with said holder arranged beneath the holder and anchored beyond the free end of the holder, said holder normally resting upon said leaf spring intermediate the ends of the latter, and means operatively associated with said diaphragm for raising the spring and thereby swinging the holder upwardly on its hinge.

13. In gas control apparatus for a furnace, a main valve, an auxiliary valve arranged for normal floating movement and responsive to pressure conditions resulting from furnace operation for regulating the gas outlet pressure of the apparatus, means for maintaining said auxiliary valve in approximately closed position during the closed condition of the main valve, and means for controlling the opening movement of said auxiliary valve as said apparatus commences delivery at the outlet thereof.

14. In gas control apparatus for a furnace, a main valve, an auxiliary valve arranged for normal floating movement and responsive to pressure conditions resulting from furnace operation for regulating the gas outlet pressure of the apparatus, means under control of the line pressure for maintaining said auxiliary valve in different positions approximating closed position during the closed condition of the main valve, and means for controlling the opening movement of said auxiliary valve as said apparatus commences delivery at the outlet thereof.

VILYNN O. BEAM.